Nov. 1, 1932.                F. KYLBERG                1,886,274
GRINDING APPARATUS
Filed July 7, 1930
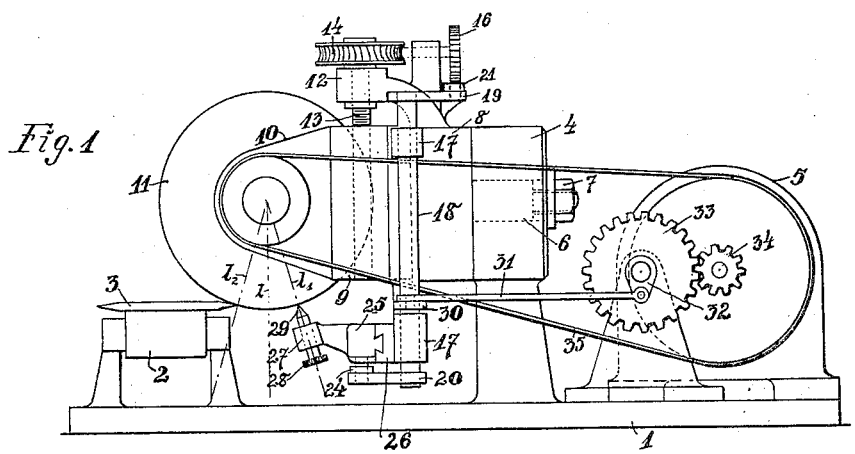
Fig.1
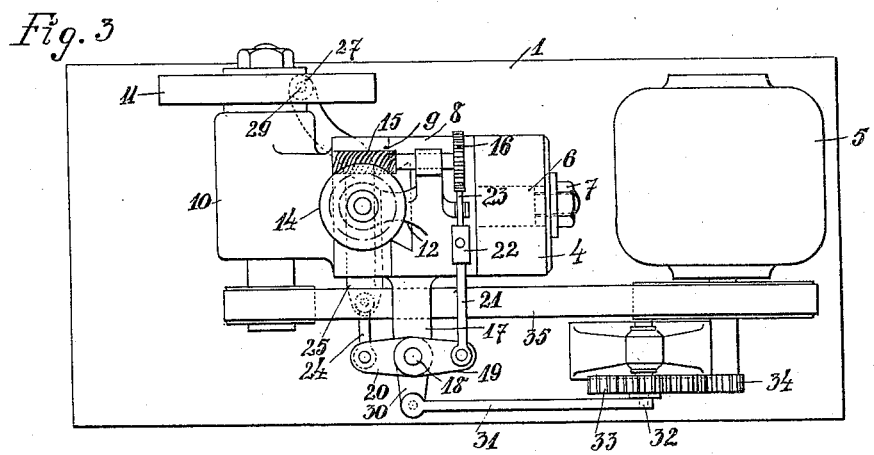
Fig.3
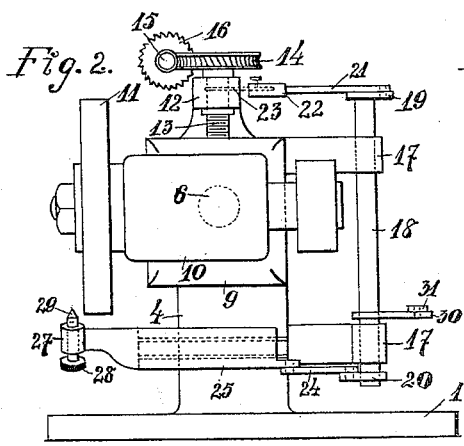
Fig.2
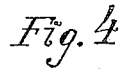
Fig.4
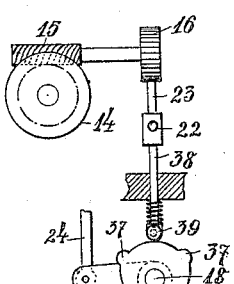

Patented Nov. 1, 1932

1,886,274

UNITED STATES PATENT OFFICE

FOLKE KYLBERG, OF GOTTENBORG, SWEDEN, ASSIGNOR TO AKTIEBOLAGET TONSOR, OF GOTTENBORG, SWEDEN, A JOINT-STOCK COMPANY OF SWEDEN

GRINDING APPARATUS

Application filed July 7, 1930, Serial No. 466,229, and in Sweden December 7, 1928.

The present invention relates to grinding apparatus for the grinding of the edges of work pieces, particularly the cutting edges of edge tools, such as blanks for razor blades in the form of bands running along the operating surface of the grinding disk during the grinding operation.

The invention refers to grinding apparatus of this type where the working is effected by means of one or more rotating grinding disks and which, for the purpose of adjusting the operating surface of each grinding disk at the peripheral portion thereof, are provided with a diamond which is continuously or intermittently movable (for instance displaceable to and fro) along a path situated relatively to the work piece in an adjustable position determined beforehand, the grinding disk being arranged to be continuously or intermittently fed against the work piece and the diamond.

The invention has for its object to facilitate an accurate and rational grinding, for instance of the cutting edge of an edge tool, by fixing the position of the cutting edge independently of the wear of the grinding disk.

The invention consists substantially in that each grinding disk is rotatable about an axis situated in or adjacent to a plane extending through the worked edge, and in that the direction of feed of the grinding disk coincides with a line dividing the angle between the two lines, which may be drawn from the center of rotation of the grinding disk, one to the diamond point and the other to the bearing point between the grinding disk and the work piece, preferably into two equal parts, the rate of feed of the grinding disk being so regulated as to be equal to or greater than the rate of feed corresponding to the natural wear against the work piece.

Preferably, the grinding apparatus may then be provided with means for adjusting the axes of the grinding disks angularly to the edge line of the work piece, whereby the operating surface of the whole grinding disk will be effectively utilized. In order then to retain the axis of the grinding disk in the plane extending through the edge line of the work piece, the adjustment has to take place about an axis arranged perpendicularly to the said plane. The guide members forming the path of the diamond must then be so arranged as to be actuated upon the adjustment of the axis of the grinding disk in question for a certain angle, in such a manner that the position of said guide members relatively to said axis remains unaltered, that is to say, their angle of adjustment shall be the same as for the grinding disk axis. The means for feeding the grinding disk toward the work piece and the diamond may preferably be intermittently operative in such a manner that feeding takes place at the end and the beginning respectively of each reciprocating movement of the diamond or on both of these occasions. It is obvious that the feeding movement may be imparted to the work piece and the diamond instead of to the grinding disk.

The accompanying drawing illustrates an embodiment of a grinding apparatus according to this invention. Fig. 1 is an elevation, Fig. 2 an endwise view, and Fig. 3 a top plan view of the grinding apparatus. Fig. 4 shows a modified embodiment of a detail of the feeding mechanism of the grinding disk.

In the drawing, 1 designates a base plate having arranged thereon a support 2 for the work piece 3, which latter is in this case a blank for razor blades in the form of a band, and a post 4 to carry the grinding apparatus proper and, finally, an electric motor 5 for the operation of the grinding apparatus. Adjustably arranged on the post 4 by means of a stud 6 with a clamping nut 7 pertaining thereto is a guide member 8 constituting the guiding means for a slide 9 which is movable up and down, said slide having the bearing arrangement 10 for the grinding disk 11 secured thereto. Provided at the upper end of the guide member 8 is an arm 12 constituting the bearing for a rotatable feeding screw 13 for the slide 9 with the grinding disk 11. Secured on the upper free end of the feeding screw 13 is a worm wheel 14 cooperating with a worm 15 which is likewise mounted in the guide member and which has a toothed wheel 16 attached to the shaft thereof. Moreover, two arms 17 are arranged on the one side of the guide member, said arms forming bearings for a shaft 18 having an arm 19 and 20 respectively secured to each end thereof. The upper arm 19 is connected by means of a link 21 with a holder 22 in which is adjustably secured a resilient tongue 23 intended to cooperate with the toothed wheel 16 on the shaft of the worm 15. The lower arm 20 is connected through a link 24 with a reciprocating slide 25 guided in a guide 26 connected with the member 8 and carrying a holder 27 for a set screw 28 which has a diamond 29 secured to the point thereof. To the shaft 18 is furthermore secured an arm 30 which is connected through a connecting rod 31 with a crank 32 arranged on the shaft of a gear wheel 33 which is driven by means of a pinion 34 from the electric motor 5, which also drives the grinding disk 11 by means of a belt 35.

When the motor 5 is started, the shaft 18 will be brought into an oscillatory movement through the connecting rod movement 31, 32 and the arm 30, while the grinding disk is at the same time caused to rotate. The arms 19 and 20 will then be alternately swung in a direction toward and from the grinding apparatus proper, which results in that the slide 25 with the diamond 29 will be displaced to and fro past the working surface of the grinding disk 11 while the holder 22 with the tongue 23 will also be brought into a similar movement, so that the toothed wheel 16 will be rotated at each other half-stroke a distance corresponding to one or more tooth pitches, depending on the adjustment of the tongue 23. The worm 15 and the wheel 14 will then be rotated, and the slide 9 with the grinding disk 11 is fed in a direction toward the edge of the work piece 3 and the diamond 29.

The said feeding movement here takes place in a direction (along the vertical line 1) dividing the angle between the two lines $1_1$ and $1_2$, which are drawn from the centre of rotation of the grinding disk to the diamond point and to the bearing point between the grinding disk and the work piece, into two equal parts, which results in that the position of the ground cutting edge remains unaltered independently of the wear of the grinding disk, the operating surface of the grinding disk being fixed in regard to its position by the reciprocating diamond 29. This symmetrical location, with respect to the plane in which the grinding disc axis moves, of the edge of the work piece and the path of movement of the diamond necessarily fixed the location of the ground edge of work piece and renders such location independent of the diameter of the grinding disc. By fixing the position of the diamond point, the position of the ground cutting edge will also be fixed, and an alteration of the first-mentioned position involves a corresponding alteration of the second position.

In order effectively to utilize the whole width of the operating surface of the disk when the work piece 3 is advanced along the grinding disk, the axis of the grinding disk may be adjusted at a suitable angle to the edge line of the work piece, which is effected by adjusting the guide member 8 and the parts carried thereby about the stud 6. The guide 26 and the slide 25 carrying the diamond 29 are then also swung through a corresponding angle, so that the position of the path of movement of the diamond relatively to the axis of the grinding disk remains unaltered. In the example shown of an embodiment involving a cylindrical grinding disk the diamond will thus always move in parallel to the axis of the grinding disk, independently of the adjustment of this axis, whereas, if a conical grinding disk is used, the diamond will always move in parallel to a generatrix of the said conical working surface.

At the above-mentioned adjustment of the grinding disk axis angularly to the edge, the said axis will be somewhat displaced out of the plane (the line $1_2$) extending through the edge, which is of little consequence, however, for the accuracy of the grinding operation.

This displacement of the grinding disk axis may be avoided, however, if the axis of rotation of the stud 6 is disposed perpendicularly to said plane (the line $1_2$).

In the embodiment above described feeding down of the grinding disk takes place at each other half-stroke, as stated, that is to say, when the diamond 29 is inside the grinding disk in the position indicated by chain-dotted lines in Fig. 2.

If desired, feeding down of the grinding disk may, however, be effected at each half-stroke, that is to say when the diamond is inside the disk 11 as well as when it is situated outside the same.

Such an embodiment of the driving mechanism for the toothed wheel 16 is shown in Fig. 4. This embodiment differs from that according to Figs. 1—3 substantially only in that the arm 19 connected with the swinging shaft 18 and actuating the driving tongue 23 is here replaced by a cam disk 36 connected with the shaft 18, said cam disk being provided with two projections 37 which, when the shaft 18 is swung to and fro, alternately actuate a rod 38 connected with the tongue 23 and guided in any suitable manner, said rod 38 being provided with a roll 39 bearing on the cam disk 36. The rod 38 with the roll 39 is then to be pressed in a direction toward the cam disk by means of a suitable spring device.

A group of four grinding apparatus arranged in accordance with the invention is required for the production of the two edges on the steel band 3 shown in the drawing, where each edge is formed by two bevelings effected in the grinding operation. For the further working of the edge, for instance for the honing thereof, one or more further groups of four grinding apparatus arranged in a similar manner may be provided along the stretched and suitably carried band, facilities being thus afforded for an accurate control of the ultimate sharpness of the edges through adjustment of the diamond, independently of the wear of the grinding disks. As according to experience the wear of the diamond is a very small one, it is thus possible by the arrangement in question to obtain a product which is very uniform in regard to the keenness of the edges, besides which the costs for inspection and testing of the quality of the edges, which costs are often most appreciable, are materially reduced.

Evidently, the invention is not in other respects limited to the embodiment shown in the drawing, it being possible in different ways to modify the feeding mechanisms for the diamond and the grinding disk, for example. Thus, for instance, the movement of the diamond may be effected hydraulically by means of a pump and a throttle valve for the control of the speed of the diamond in the conduit connecting the pump with that piston or the like to which the diamond is secured. The reciprocating movement of the diamond may then be obtained in known manner by means of suitable controlling means (valve or slide control).

For the feeding of the grinding disk measures may be taken to obtain impulses for such feeding from the movement of the diamond at the one or both ends of the stroke thereof, said impulses being then transmitted to the feeding screw or the like of the grinding disk by means of mechanical, hydraulical or magnetically acting arrangements.

What I claim is:—

1. A grinding machine for the working of edges of work pieces, comprising a rotary grinding disc, means for rotating said disc about an axis situated substantially in a plane extending through the edge to be worked, a truing device including a diamond, means for reciprocating said truing device transversely across the peripheral portion of said grinding disc, a guideway for said truing device, and means for feeding the grinding disc towards the work piece and the diamond by advancing the axis of the grinding disc in a plane located substantially midway between the worked edge of the work piece and the path of movement of the diamond, the rate of feed of the grinding disc being not less than the rate of natural wear of the disc against the work piece.

2. A grinding machine for the working of edges of work pieces, comprising a rotary grinding disc, means for rotating said disc about an axis situated substantially in a plane extending through the edge to be worked, a truing device including a diamond, means for moving said truing device transversely across the peripheral portion of said grinding disc, a guideway for said truing device, means for angularly adjusting the axis of the grinding disc with respect to the edge line of the work piece, and means for feeding the grinding disc towards the work piece and the diamond by advancing the axis of the grinding disc in a plane located substantially midway between the worked edge of the work piece and the path of movement of the diamond, the rate of feed of the grinding disc being not less than the rate of natural wear of the disc against the work piece.

3. A grinding machine for the working of edges of work pieces, comprising a rotary grinding disc, means for rotating said disc about an axis situated substantially in a plane extending through the edge to be worked, a truing device including a diamond, means for reciprocating said truing device transversely across the peripheral portion of said grinding disc, a guide way for said truing device, means for angularly adjusting the axis of the grinding disc with respect to the edge line of the work piece, means for angularly adjusting the path of the guide way of the truing device to the same degree as that of the axis of the grinding disc, so that the position of said path relatively to said axis remains unaltered, and means for feeding the grinding disc towards the work piece and the diamond by advancing the axis of the grinding disc in a plane located substantially midway between the worked edge of the work piece and the path of movement of the diamond, the rate of feed of the grinding disc being not less than the rate of natural wear of the disc against the work piece.

4. A grinding machine as claimed in claim 1, characterized by the feeding means for the grinding disc being intermittently operative to advance the grinding disc only at the end and at the beginning respectively of each reciprocating movement of the truing device.

5. A grinding machine as claimed in claim 1, characterized by the same being arranged for the grinding of one or two cutting edges of edge tools, said edges being each formed by one or two bevelings, for instance for the grinding of blanks for razor blades in the form of bands, the position of the diamond point being preferably so adjusted with respect to the feeding direction of the grinding disc that the position of the cutting edge remains fixed independently of the alteration which the diameter of the grinding disc is subjected to in the grinding operation.

FOLKE KYLBERG.